US011815705B2

(12) United States Patent
Nguyen

(10) Patent No.: US 11,815,705 B2
(45) Date of Patent: Nov. 14, 2023

(54) INNOVATIVE SOLUTIONS FOR IMPROVING LASER DAMAGE PERFORMANCE OF MULTI-LAYER DIELECTRIC GRATINGS

(71) Applicant: Lawrence Livermore National Security, LLC, Livermore, CA (US)

(72) Inventor: Hoang T Nguyen, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 202 days.

(21) Appl. No.: 16/698,555

(22) Filed: Nov. 27, 2019

(65) Prior Publication Data

US 2020/0096684 A1    Mar. 26, 2020

Related U.S. Application Data

(63) Continuation-in-part of application No. PCT/US2018/034497, filed on May 24, 2018.

(60) Provisional application No. 62/514,707, filed on Jun. 2, 2017.

(51) Int. Cl.
*G02B 5/18* (2006.01)
*G02B 1/11* (2015.01)

(52) U.S. Cl.
CPC .............. *G02B 5/1847* (2013.01); *G02B 1/11* (2013.01); *G02B 5/1833* (2013.01)

(58) Field of Classification Search
CPC ...... G02B 5/1847; G02B 1/11; G02B 5/1833; G02B 1/113; G02B 1/115; G02B 5/18; G02B 5/1838; G02B 5/1861; G02B 5/1866; G02B 5/20; G02B 5/208; G02B 5/28; G02B 5/283; G02B 5/285; G02B 5/286; G02B 27/42; G02B 27/4294
USPC ....... 359/576, 350, 359, 558, 566, 569, 572, 359/577, 580, 586, 588, 589, 590
See application file for complete search history.

(56) References Cited

U.S. PATENT DOCUMENTS

| 5,907,436 A | 5/1999 | Perry et al. |
| 6,173,001 B1 | 1/2001 | Zayhowski |
| 2005/0181131 A1 | 8/2005 | Linares et al. |
| 2007/0085447 A1 | 4/2007 | Larson, III |
| 2007/0267135 A1 | 11/2007 | Kim et al. |
| 2012/0269483 A1 | 10/2012 | Mossberg et al. |
| 2014/0261628 A1 | 9/2014 | Meitl et al. |

(Continued)

FOREIGN PATENT DOCUMENTS

| CN | 102529214 A | * 7/2012 | ......... C23C 16/0272 |
| CN | 109811409 B | 1/2021 | |

(Continued)

OTHER PUBLICATIONS

International Search Report and Written Opinion for PCT/US2018/034497 corresponding to U.S. Appl. No. 16/698,555, 10 pages.

(Continued)

*Primary Examiner* — Arnel C Lavarias
(74) *Attorney, Agent, or Firm* — Knobbe Martens Olson & Bear LLP

(57) ABSTRACT

Optical thin film designs are provided that achieve significantly improved laser damage thresholds and ultra-low-loss. These advances may be achieved by utilizing materials with electronic band gaps and refractive indices that are higher than those that are conventionally used.

54 Claims, 4 Drawing Sheets

(56) References Cited

U.S. PATENT DOCUMENTS

| | | | |
|---|---|---|---|
| 2016/0111223 A1 | 4/2016 | Bryant et al. | |
| 2017/0047707 A1* | 2/2017 | Hamilton | ............ H01S 5/02484 |
| 2017/0269263 A1* | 9/2017 | Khan | ....................... G02B 1/11 |
| 2018/0202069 A1 | 7/2018 | Pan et al. | |
| 2021/0263201 A1 | 8/2021 | Nguyen | |

FOREIGN PATENT DOCUMENTS

| | | | |
|---|---|---|---|
| EP | 2994784 B1 * | 3/2019 | ......... C03C 17/3435 |
| KR | 10-2007-0120491 A | 12/2007 | |
| WO | 01-39286 A1 | 5/2001 | |
| WO | WO 2018/222504 A2 | 12/2018 | |
| WO | WO 2019/031786 A1 | 2/2019 | |
| WO | WO-2019027913 A1 * | 2/2019 | ......... C03C 17/3441 |
| WO | WO-2020069261 A1 * | 4/2020 | ............. B32B 7/022 |
| WO | WO 2021/118763 A2 | 6/2021 | |
| WO | WO 2022/174245 A1 | 8/2022 | |

OTHER PUBLICATIONS

International Search Report and Written Opinion dated Jun. 24, 2021 in Application No. PCT/US2020/060801 in 10 pages.
International Preliminary Report on Patentability dated Jun. 9, 2022 in Application No. PCT/US2020/060801 in 7 pages.
International Search Report and Written Opinion dated Jun. 3, 2022 in Application No. PCT/US22/70613 in 14 pages.

* cited by examiner

INNOVATIVE SOLUTIONS FOR IMPROVING LASER DAMAGE PERFORMANCE OF MULTI-LAYER DIELECTRIC GRATINGS

CROSS-REFERENCE TO RELATED APPLICATIONS

This application is a continuation-in-part of PCT/US2018/034497 titled "Innovative Solutions for Improving Laser Damage Performance of Multi-Layer Dielectric Gratings," filed May 24, 2018, incorporated herein by reference. PCT/US2018/034497 claims the benefit of U.S. Provisional Patent Application No. 62/514,707 titled "Innovative Solutions for Improving Laser Damage Performance of Multi-Layer Dielectric Gratings," filed Jun. 2, 2017, incorporated herein by reference.

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC, for the operation of Lawrence Livermore National Laboratory.

BACKGROUND OF THE INVENTION

Field of the Invention

The present invention relates to multi-layer dielectric coatings, and more specifically, it relates to techniques for improving the laser damage performance of such coatings.

Description of Related Art

In high power laser devices and systems, one of the major concerns deals with the damage threshold of the optical components. The laser induced damage threshold (LIDT) of the coatings is usually the limiting factor of such devices. In nearly all of current optical systems—from the simplest to the most complex—optical thin films play a critical role. They tailor the reflective, transmissive, polarizing and dispersive properties of the optics, and greatly influence the overall performance of optical systems and instruments. In high-power applications, thin-film dielectric coatings are especially important because they are often the limiting factor driving performance. Historically, large laser systems used in the military, laser fusion and industrial welding and cutting have dominated the high-power industry. Many of these systems are based on nonlinear optical technology that requires high peak powers to maximize frequency conversion. Other systems, such as those used in the semiconductor industry for repair and testing, need high power to produce localized microscopic heating or cutting. The optics used in all these laser systems require low losses, high efficiency, low absorption, precise spectral optical properties and high laser damage thresholds.

Many factors influence laser damage in optics. One of the most common causes of catastrophic failure is the absorption of energy through gross defect sites on the coating itself. Thus, surface preparation (including polishing) and coating quality are major factors that limit performance. Energy absorption generates heat that causes localized melting, thermal stress fractures, or, if sufficient heat is generated, a small explosion that ablates the coating.

Laser induced damage threshold (LIDT) is of great importance for both high-energy pulse compression gratings and high-average power applications such as Spectral Beam Combining (SBC). A critical optical component used in both technologies is the multi-layer dielectric (MLD) grating utilizing advanced and novel optical thin film stacks. This optical element is required to handle the full power load, with minimal thermal distortion over a limited spot size. The power densities and thermal loads on this optical element are the limiting factor in power scaling of the technology. Current grating designs have significant limitations in overall power handling. It is desirable to provide substantial advances in several topical areas to improve the laser damage threshold and to provide reduced absorption and increased diffraction efficiency.

SUMMARY OF THE INVENTION

The present invention provides substantial advances in several topical areas to improve the performance of multi-layer dielectric gratings (MDGs), such as improved laser damage threshold, reduced absorption and increased diffraction efficiency. It enables significant scaling in output energy and average power for next generation ultrafast and spectrally-combined laser systems.

Embodiments of the present invention provide new optical thin film designs with significantly improved laser damage thresholds, and ultra-low-loss. These advances may be achieved by utilizing materials with electronic band gaps and refractive indices that are higher than those that are conventionally used. Additional embodiments provide multilayer dielectric optical film stacks with significantly improved laser damage thresholds and ultra-low-loss.

Embodiments of the present invention include a multi-layer dielectric grating where a grating structure is affixed onto the top layer of layer of a dielectric stack. The multi-layer structure is designed for use with the grating layer since the grating layer will comprise one of the layers of the multilayer stack. The multilayer stack is affixed to a substrate. Any number of the layers of multilayer stack may have an electronic band gap that is at least 6.0 eV and an index of refraction that is at least 1.8. Additionally, or alternately, the grating layer may have an electronic band gap that is at least 6.0 eV and an index of refraction that is at least 1.8. At least one layer of the layers of the stack, and/or the grating, comprise a dielectric material, where each layer of the plurality of layers comprises either a high refractive index dielectric material or a low refractive index dielectric material, where the high refractive index dielectric material and the low refractive index dielectric material comprise a difference in refractive index greater than 0.1, where the plurality of layers comprises a top layer and a bottom layer, where the bottom layer is affixed to the substrate. The dielectric material for some embodiments can consist of diamond, aluminum nitride, boron nitride, magnesium oxide, # yttrium oxide and/or scandium oxide. As an alternate to the grating, the embodiment can be configured as a quarter-wave stack, a Highly reflecting laser mirror, a partially transmissive output coupler, a dichroic mirror, an optical filter, a beam splitter, a heat reflector, a solar cell cover, a thin-film polarizer, a Bragg mirror and a Rugate filter. At least one layer of the plurality of layers can comprise an anti-reflection coating. Material transparent to a wavelength of interest is generally utilized to form the dielectric stack. The dielectric stack can be formed of alternating layers of oxide material. The substrate can comprise transparent or opaque material, can be of reflective material and can be flat, curved or a combination thereof. The substrate surface is appropriately prepared prior to affixing the plurality of layers to the substrate. Further, the dielectric stack may comprise alternating layers of material transparent to a wavelength of interest, where each layer comprises one or oxide material, fluoride material, sulfide material, selenide material and nitride material. The alternating layers of oxide materials can be designed to serve as a coating of any reflectance for a wavelength of interest. Dielectric material can be utilized as the substrate and such material can include one or more of glass, silica and sapphire. Further, the substrate can be formed of organic material, polymeric material, plastics, nylon, resin and semiconductor material silicon and gallium arsenide. The invention further contemplates a method for fabricating the described embodiments.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 2:
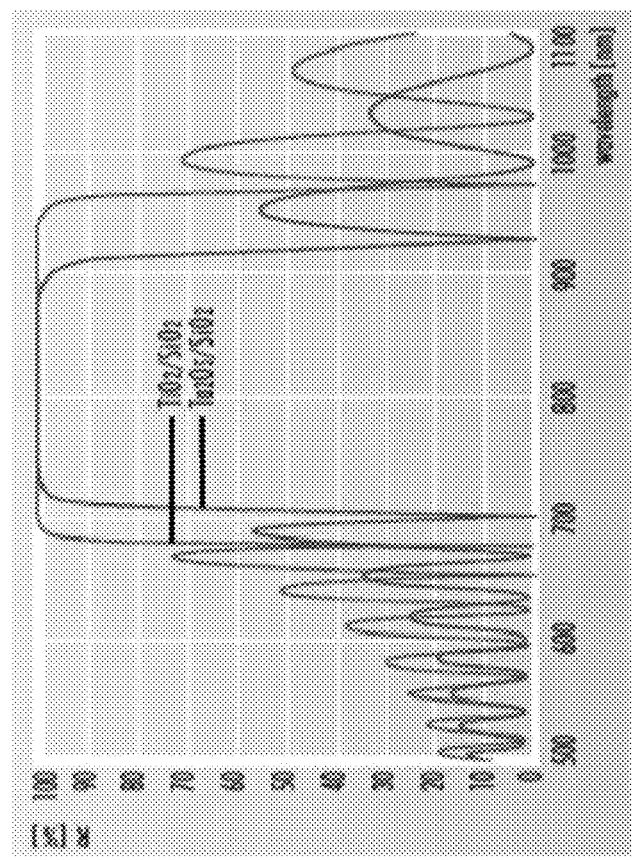
FIG. 2 shows reflectivity spectra of two quarter-wave stacks consisting of 15 pairs of $Ta_2O_5/SiO_2$ and $TiO_2/SiO_2$.

The Diffractive Optics Group of the National Ignition Facility (NIF) Directorate at Lawrence Livermore National Laboratory (LLNL) is the preeminent supplier of large-aperture, high damage-threshold diffraction gratings and other diffractive optics to laser institutions around the world. Presently, the LLNL group is the only supplier of polarization insensitive Spectral Beam Combining (SBC) gratings. These gratings, designed for polarization independent operation at nominally 1 μm and with a Littrow out-of-plane (conical) mounting, have been shown to have >98% diffraction efficiency over >40 nm bandwidth.

The current (prior art) grating designs, have significant laser damage threshold limitations and overall power handling limitations due to the high-index, low bandgap, material utilized in the "grating pillars" such as $Ta_2O_5$ and $HfO_2$. Laser damage thresholds are highly dependent on the effective bandgap of the dielectric material. The reason for the bandgap dependence appears to be extreme localized heating from the highly absorbing particulates. Such localized heating cause thermal free carriers to be generated, which sets off a runaway process of free carrier absorption and generation.

Embodiments of the present invention include new grating designs where one or more of the individual layers of the grating are made of the higher bandgap material. These grating provide significantly improved laser damage thresholds, ultra-low-loss, and high diffraction efficiency and are achieved by utilizing materials that have an electronic band gap of at least 6.0 eV (i.e.; diamond, aluminum nitride, boron nitride) and an index of refraction that is greater than 1.8.

The invention is further useable in all multilayer dielectric optical film stacks to improve their laser damage threshold (LDT). Dielectric coatings, also called thin-film coatings or interference coatings, consist of thin (typically sub-micron) layers of transparent dielectric materials, which are deposited on a substrate. Their function is essentially to modify the reflective properties of the surface by exploiting the interference of reflections from multiple optical interfaces. Their uses include for highly reflecting laser mirrors or partially transmissive output couplers, for dichroic mirrors (treating different wavelengths differently), for anti-reflection coatings and for various kinds of optical filters (e.g., for attenuation of certain wavelength regions), beam splitters, heat reflectors, solar cell covers and thin-film polarizers. While simple single-layer coatings are often used as anti-reflection coatings, dielectric mirrors normally use dozens of thin-film layers, sometimes even more than 100. Embodiments of the present invention comprise one or more of the individual layers made of the higher bandgap material. A typical mirror design is the simple Bragg mirror, but there are many more sophisticated mirror designs. The typical kind of dielectric coating consists of discrete layers with substantially different refractive indices. However, there are also gradient-index coatings for Rugate filters, where the refractive index is varied continuously. That can be achieved, for example, by gradually varying the chemical composition of the material during growth.

In many cases, the coating substrate is some kind of glass, with a wide transparency range and high optical quality (low bubble content), a very smooth surface (after proper polishing), and high durability. However, dielectric coatings can also be applied to crystalline materials and even on metal substrates, e.g., as anti-reflection coatings on nonlinear crystals for nonlinear frequency conversion and Pockels cells, or on semiconductor devices such as edge-emitting laser diodes, vertical cavity surface-emitting lasers and photodiodes. A further area of increasing importance is the fabrication of dielectric coatings on polymers (plastic materials), as plastic optics are increasingly used due to their competitive properties, e.g., in terms of price and the ease of fabricating non-spherical surfaces (e.g., for aspheric lenses).

The material properties of the dielectric films can substantially depend on the used fabrication method and fabrication parameters such as the substrate temperature or partial pressures of various substances. Compared with the ordinary bulk materials of nominally the same chemical composition, thin-film layers often have a reduced packing density and a reduced refractive index. When designing a dielectric coating for fabrication on a certain coating machine, one should have the refractive index data for that machine under the used conditions, as the differences can be substantial.

Figure 1:
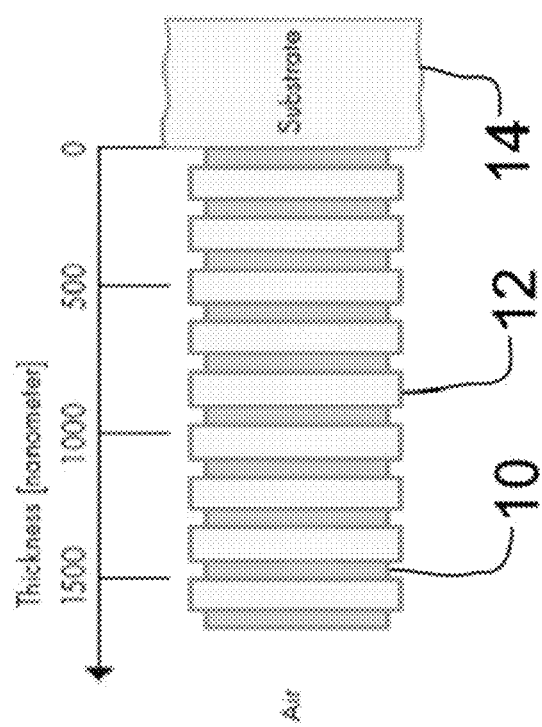
FIG. 1 is a schematic drawing of a quarter-wave stack consisting of layers with equal optical thickness of a high index material and a low index material.
Figure 3:
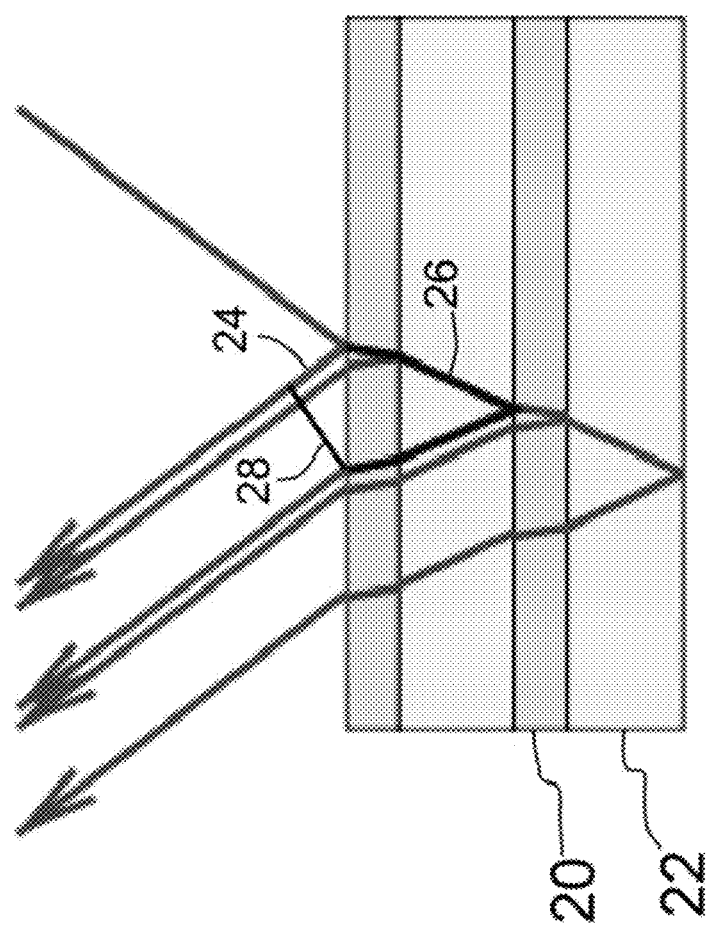
FIG. 3 is a diagram of a dielectric mirror where thin layers with a high index material are interleaved with thicker layers of a lower refractive index n2.

For optical mirrors and partial reflectors, the most common mirror design is the so-called quarter wave stack, i.e., a stack of alternating high and low index layers with an equal optical thickness of $nt=\lambda/4$ for the desired wavelength. See FIG. 1, which is a schematic drawing of a quarter-wave stack consisting of alternating layers with equal optical thickness of a high index material 10 and a low index material 12, respectively. In this embodiment, a high index layer is in direct contact with substrate 14. The alternating indexes result in constructive interference of the reflected beams arising at each interface between the layers. The spectral width of the reflection band and the achievable reflectivity for a given number of layer pairs depends on the ratio of the refractive indices of the layer materials. A large refractive index ratio results in a broad reflection band while a narrow reflection band can be produced using materials with a low refractive index ratio. FIG. 2 shows reflectivity spectra of two quarter-wave stacks consisting of 15 pairs of $Ta_2O_5/SiO_2$ and $TiO_2/SiO_2$. FIG. 3 is a diagram of a dielectric mirror. Thin layers 20 with a high index material are interleaved with thicker layers 22 of a lower refractive index. The path lengths 24 and 26 to respective points intersecting line 28 differ by exactly one wavelength, which leads to constructive interference. The laser damage threshold of these devices, and all of the devices mentioned in this disclosure, is improved when one or more layers are formed of the higher bandgap material of the present invention. Techniques for fabricating multilayer dielectric gratings are well known in the art. See, e.g., U.S. Pat. No. 5,907,436. Those skilled in the art, based on the present disclosure, will understand that the present invention has wide application, including to other optical materials.

Figure 4:
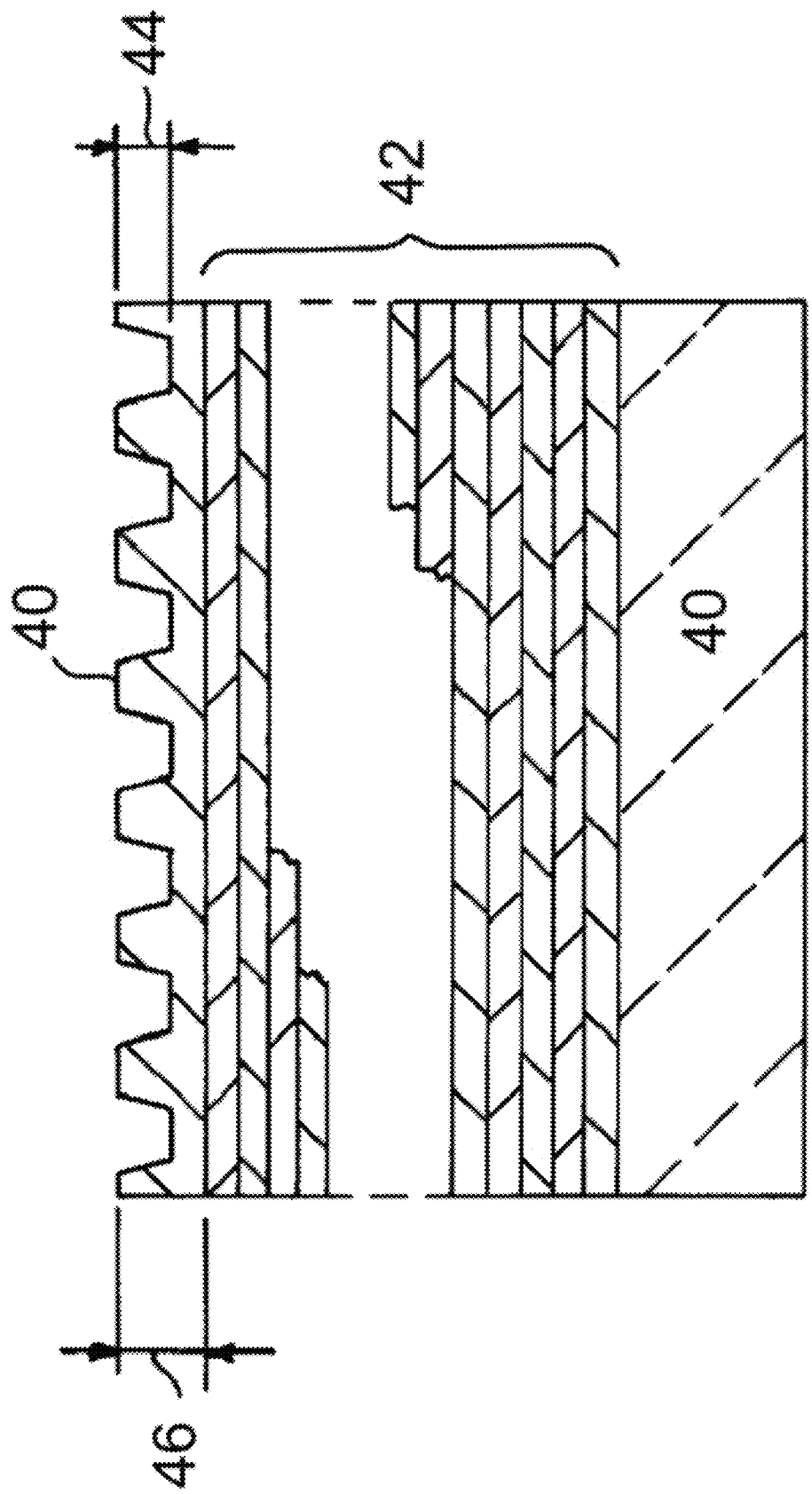
FIG. 4 show a schematic of an exemplary multilayer dielectric grating according to the principles of the present invention.

FIG. 4 shows an embodiment of a multilayer dielectric grating according to the present invention. Grating 40 is affixed onto the top layer of layer of the dielectric stack 42. The multilayer structure 42 must be designed for use with the grating layer 40 under consideration since the grating layer 40 will comprise one of the layers of the multilayer stack 42. The multilayer stack 42 is affixed to a substrate 44. The figure shows groove height 44 and top layer thickness 46. Any number of the layers of multilayer stack 42 may have an electronic band gap that is at least 6.0 eV and an index of refraction that is at least 1.8. Additionally, or alternately, grating layer 40 may have an electronic band gap that is at least 6.0 eV and an index of refraction that is at least 1.8.

Referring still to FIG. 4, at least one layer of the layers of the stack 42, and/or the grating 40 comprise a dielectric material, where each layer of the plurality of layers comprises either a high refractive index dielectric material or a low refractive index dielectric material, where the high refractive index dielectric material and the low refractive index dielectric material comprise a difference in refractive index greater than 0.1, where the plurality of layers comprises a top layer and a bottom layer, where the bottom layer is affixed to the substrate. The dielectric material for some embodiments can consist of diamond, aluminum nitride, boron nitride, magnesium oxide, # yttrium oxide and/or scandium oxide. As an alternate to the grating, the embodiment can be configured as a quarter-wave stack, a highly reflecting laser mirror, a partially transmissive output coupler, a dichroic mirror, an optical filter, a beam splitter, a heat reflector, a solar cell cover, a thin-film polarizer, a Bragg mirror and a Rugate filter. At least one layer of the plurality of layers can comprise an anti-reflection coating. Material transparent to a wavelength of interest is generally utilized to form the dielectric stack. The dielectric stack can be formed of alternating layers of oxide material. The substrate can comprise transparent or opaque material, can be of reflective material and can be flat, curved or a combination thereof. The substrate surface is appropriately prepared prior to affixing the plurality of layers to the substrate. Further, the dielectric stack may comprise alternating layers of material transparent to a wavelength of interest, where each layer comprises one or oxide material, fluoride material sulfide material, selenide material and nitride material. The alternating layers of oxide materials can be designed to serve as a coating of any reflectance for a wavelength of interest. Dielectric material can be utilized as the substrate and such material can include one or more of glass, silica and sapphire. Further, the substrate can be formed of organic material, polymeric material, plastics, nylon, resin and semiconductor material silicon and gallium arsenide. The invention further contemplates method for fabricating the exemplary embodiment of FIG. 4.

Figure 5:
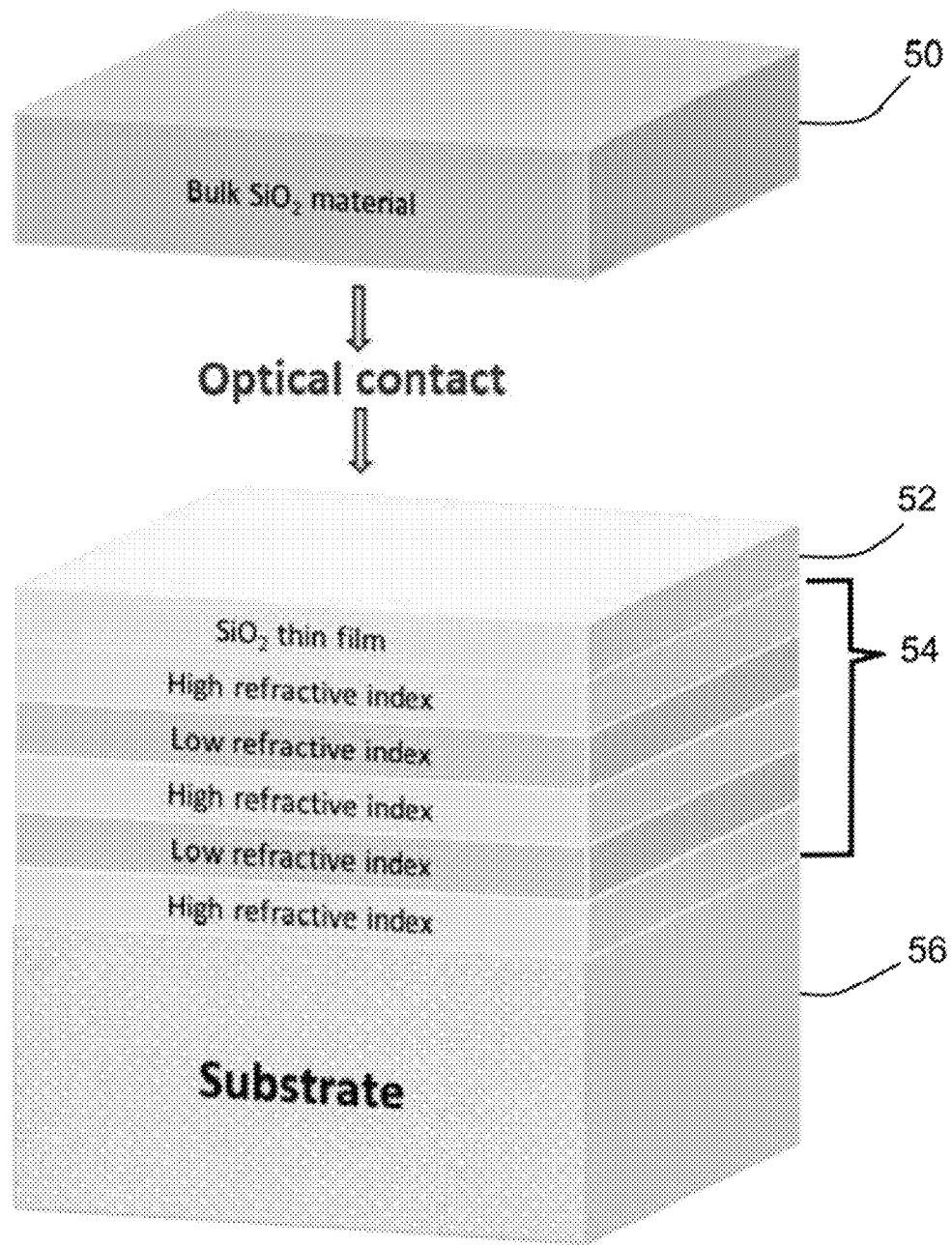
FIG. 5 shows an embodiment where a high bandgap bulk material layer is optically bonded to the external or outermost layer of the multilayer dielectric grating stack of the present invention.

Some embodiments of the invention optically bond a high bandgap bulk material layer, such as fused silica, diamond, sapphire, etc. to the external or outermost layer of the multilayer dielectric grating stack of the present invention. For high power CW laser applications, a predominant mechanism for laser damage is extreme localized heating from highly absorbing particulates (damage initiators) that cause thermal free carriers to be generated, which sets off a runaway process of free carrier absorption and generation. In many instances, the damage initiators are not intrinsic to the coating deposition process, but a product of the environment that the optics are in such as with dirt, metal particulates from screws and optical mounts, outgassing oils and fluoropolymers, etc. Referring to FIG. 5, a thick layer of high bandgap material 50 such as fused silica, diamond, sapphire, etc. used as an outer layer would greatly reduce this type of laser damage but such layer cannot be deposited in a thick enough layer to make a difference. Problems such as delamination or highly compressive stress of underlying layers results if fused silica is deposited to an effective thickness. The idea here is to provide a bulk layer of the desired thickness and then optically bond it to the outer layer. It is essential for obtain the highest laser damage threshold performance that the optical bond be chemical free—no adhesive or epoxy, such as optical contacting or diffusion bonding. In the figure, a thick layer 50 of bulk $SiO_2$ is optically bonded to a thin $SiO_2$ layer 52 which is deposited onto alternating layers of high and low refractive index material 54 which is deposited onto substrate 56. Based on this disclosure, those skilled in the art will understand that there are other means for adhering the bulk $SiO_2$ layer to the multilayer stack. $SiO_2$ is but one example of a high bandgap material useable in this embodiment. Based on this disclosure, those skilled in the art will understand that other high bandgap materials are useable as well. The device can comprise a relatively thick layer of high bandgap material adherent to the outer layer of the plurality of layers, where the high bandgap material has a band gap that is at least 5.0 eV. Further, the high bandgap material can comprise an index of refraction that is at least 1.4, and the relatively thick layer can have a thickness of at least >50 microns. A method of the invention can further comprise adhering a relatively thick layer of high bandgap material to the outer layer of the plurality of layers, where the high bandgap material has a band gap that is at least 5.0 eV. The high bandgap material can comprise an index of refraction that is at least 1.4, and the relatively thick layer can have a thickness of at least >50 microns.

Concepts:

This writing also presents at least the following concepts:

1. An apparatus, comprising:
a substrate; and
a plurality of layers on said substrate, wherein at least one layer of said layers comprises material with an electronic band gap that is at least 6.0 eV and an index of refraction that is at least 1.8.

2. The apparatus of concepts 1 and 3-25, wherein at least one layer of said layers comprises a dielectric material, wherein each layer of said plurality of layers comprises either a high refractive index dielectric material or a low refractive index dielectric material, wherein said high refractive index dielectric material and said low refractive index dielectric material comprise a difference in refractive index greater than 0.1, wherein said plurality of layers comprises a top layer and a bottom layer, wherein said bottom layer is affixed to said substrate.

3. The apparatus of concepts 1, 2 and 4-25, wherein said material is selected from the group consisting of diamond, aluminum nitride, boron nitride, magnesium oxide, # yttrium oxide and scandium oxide.

4. The apparatus of concepts 1-3 and 5-25, wherein said apparatus comprises a multi-layer dielectric (MLD) grating.

5. The apparatus of concepts 1-4 and 6-25, wherein said apparatus comprises a multilayer dielectric stack.

6. The apparatus of concepts 1-5 and 7-25, wherein said apparatus comprises a quarter-wave stack.

7. The apparatus of concepts 1-6 and 8-25, wherein said apparatus is selected from the group comprising a highly reflecting laser mirror, a partially transmissive output coupler, a dichroic mirror, an optical filter, a beam splitter, a heat reflector, a solar cell cover, a thin-film polarizer, a Bragg mirror and a Rugate filter.

8. The apparatus of concepts 1-7 and 9-25, wherein at least one layer of said plurality of layers comprises an anti-reflection coating.

9. The apparatus of concept 5, wherein said dielectric stack comprises dielectric material transparent to a wavelength of interest.

10. The apparatus of concept 5, wherein said dielectric stack comprises alternating layers of oxide material.

11. The apparatus of concepts 1-10 and 12-25, wherein said substrate comprises transparent material.

12. The apparatus of concepts 1-11 and 13-25, wherein said substrate comprises opaque material.

13. The apparatus of concepts 1-12 and 14-25, wherein said substrate comprises reflective material.

14. The apparatus of concepts 1-13 and 15-25, wherein said substrate is at flat.

15. The apparatus of concepts 1-14 and 16-25, wherein said substrate comprises a curved surface.

16. The apparatus of concept 15, wherein said curved surface has been prepared prior to affixing said plurality of layers to said substrate.

17. The apparatus of concept 5, wherein said dielectric stack comprises alternating layers of material transparent to a wavelength of interest, wherein said each layer comprises a material selected from the group consisting of oxide material, fluoride material, sulfide material, selenide material and nitride material.

18. The apparatus of concept 5, wherein said dielectric stack comprises alternating layers of oxide materials that are designed to serve as a coating of any reflectance for a wavelength of interest.

19. The apparatus of concepts 1-18 and 20-25, wherein said substrate comprises dielectric material.

20. The apparatus of concepts 1-19 and 21-25, wherein said substrate comprises dielectric material selected from the group consisting of glass, silica and sapphire.

21. The apparatus of concepts 1-20 and 22-25, wherein said substrate comprises organic material.

22. The apparatus of concepts 1-21 and 23-25, wherein said substrate comprises polymeric material.

23. The apparatus of concepts 1-22, 24 and 25, wherein said substrate comprises material selected from the group consisting of plastics, nylon and resin.

24. The apparatus of concepts 1-23 and 25, wherein said substrate comprises semiconductor material.

25. The apparatus of concepts 1-24, wherein said substrate comprises semiconductor material selected from the group consisting of silicon and gallium arsenide.

26. A method for fabricating an apparatus, the method comprising:
providing a substrate;
forming a plurality of layers on said substrate, wherein at least one layer of said layers comprises material with an electronic band gap that is at least 6.0 eV and an index of refraction that is at least 1.8.

27. The method of concepts 26 and 28-50, wherein said each layer comprises a dielectric material, wherein said each layer comprises either a high refractive index dielectric material or a low refractive index dielectric material, wherein said high refractive index dielectric material and said low refractive index dielectric material comprise a difference in refractive index greater than 0.1, wherein said plurality of layers comprises a top layer and a bottom layer, wherein said bottom layer is affixed to said substrate.

28. The method of concepts 26, 27 and 29-50, wherein said material is selected from the group consisting of diamond, aluminum nitride, boron nitride, magnesium oxide, yttrium oxide and scandium oxide.

29. The method of concepts 26-28 and 30-50, wherein said apparatus comprises a multi-layer dielectric (MLD) grating.

30. The method of concepts 26-29 and 31-50, wherein said apparatus comprises a multilayer dielectric stack.

31. The method of concepts 26-30 and 32-50, wherein said apparatus comprises a quarter-wave stack.

32. The method of concepts 26-31 and 33-50, wherein said apparatus is selected from the group comprising a highly reflecting laser mirror, a partially transmissive output coupler, a dichroic mirror (treating different wavelengths differently), an optical filter (e.g., for attenuation of certain wavelength regions), a beam splitter, a heat reflector, a solar cell cover, a thin-film polarizer, a Bragg mirror and a Rugate filter.

33. The method of concepts 26-32 and 34-50, wherein said layer comprises an anti-reflection coating.

34. The method of concept 30, wherein said dielectric stack comprises dielectric material transparent to a wavelength of interest.

35. The method of concept 30, wherein said dielectric stack comprises alternating layers of oxide material.

36. The method of concepts 26-35 and 37-50, wherein said substrate comprises transparent material.

37. The method of concepts 26-36 and 38-50, wherein said substrate comprises opaque material.

38. The method of concepts 26-37 and 39-50, wherein said substrate comprises reflective material.

39. The method of concepts 26-38 and 40-50, wherein said substrate is at flat.

40. The method of concepts 26-39 and 41-50, wherein said substrate comprises a curved surface.

41. The method of concept 40, wherein said curved surface has been prepared prior to affixing said plurality of layers to said substrate.

42. The method of concept 30, wherein said dielectric stack comprises alternating layers of material transparent to a wavelength of interest, wherein said each layer comprises a material selected from the group consisting of oxide material, fluoride material, sulfide material, selenide material and nitride material.

43. The method of concept 30, wherein said dielectric stack comprises alternating layers of oxide materials that are designed to serve as a coating of any reflectance for a wavelength of interest.

44. The method of concepts 26-43 and 45-50, wherein said substrate comprises dielectric material.

45. The method of concepts 26-44 and 46-50, wherein said substrate comprises dielectric material selected from the group consisting of glass, silica and sapphire.

46. The method of concepts 26-45 and 47-50, wherein said substrate comprises organic material.

47. The method of concepts 26-46 and 48-50, wherein said substrate comprises polymeric material.

48. The method of concepts 26-47, 49 and 50, wherein said substrate comprises material selected from the group consisting of plastics, nylon and resin.

49. The method of concepts 26-48 and 50, wherein said substrate comprises semiconductor material.

50. The method of concepts 26-49, wherein said substrate comprises semiconductor material selected from the group consisting of silicon and gallium arsenide.

51. The apparatus of concepts 1-25, further comprising a relatively thick layer of high bandgap material adherent to the outer layer of said plurality of layers, wherein said high bandgap material has a band gap that is at least 5.0 eV.

52. The apparatus of concept 51, wherein said high bandgap material comprises an index of refraction that is at least 1.4, wherein said relatively thick layer has a thickness of at least >50 microns.

53. The method of concepts 26-50, further comprising adhering a relatively thick layer of high bandgap material to the outer layer of said plurality of layers, wherein said high bandgap material has a band gap that is at least 5.0 eV.

54. The method of concept 53, wherein said high bandgap material comprises an index of refraction that is at least 1.4, wherein said relatively thick layer has a thickness of at least >50 microns.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:
1. An apparatus, comprising:
a substrate;
a plurality of layers on said substrate, wherein at least one layer of said layers comprises material with an electronic band gap that is at least 6.0 eV; and
a bulk layer not deposited on, but optically bonded to an outer layer of said plurality of layers, wherein said bulk layer comprises fused silica or sapphire with an electronic band gap that is at least 5.0 eV,
wherein said outer layer of said plurality of layers comprises fused silica or sapphire.

2. The apparatus of claim 1, wherein each layer of said plurality of layers comprises either a high refractive index dielectric material or a low refractive index dielectric material, wherein said high refractive index dielectric material and said low refractive index dielectric material comprise a difference in refractive index greater than 0.1, wherein said plurality of layers comprises a bottom layer, wherein said bottom layer is affixed to said substrate.

3. The apparatus of claim 1, wherein said material of said at least one layer of said layers is selected from the group consisting of diamond, aluminum nitride, boron nitride, magnesium oxide, yttrium oxide and scandium oxide.

4. The apparatus of claim 1, wherein said apparatus comprises a multi-layer dielectric (MLD) grating.

5. The apparatus of claim 1, wherein said apparatus comprises a multi-layer dielectric stack.

6. The apparatus of claim 1, wherein said apparatus comprises a quarter-wave stack.

7. The apparatus of claim 1, wherein said apparatus is selected from the group comprising a highly reflecting laser mirror, a partially transmissive output coupler, a dichroic mirror, an optical filter, a beam splitter, a heat reflector, a solar cell cover, a thin-film polarizer, a Bragg mirror and a Rugate filter.

8. The apparatus of claim 1, wherein at least one layer of said plurality of layers comprises an anti-reflection coating.

9. The apparatus of claim 5, wherein said dielectric stack comprises dielectric material transparent to a wavelength of interest.

10. The apparatus of claim 5, wherein said dielectric stack comprises alternating layers of oxide material.

11. The apparatus of claim 1, wherein said substrate comprises transparent material.

12. The apparatus of claim 1, wherein said substrate comprises opaque material.

13. The apparatus of claim 1, wherein said substrate comprises reflective material.

14. The apparatus of claim 1, wherein said substrate is flat.

15. The apparatus of claim 1, wherein said substrate comprises a curved surface.

16. The apparatus of claim 15, wherein said curved surface has been prepared prior to affixing said plurality of layers to said substrate.

17. The apparatus of claim 5, wherein said dielectric stack comprises alternating layers of material transparent to a wavelength of interest, wherein each layer of said alternating layers comprises a material selected from the group consisting of oxide material, fluoride material, sulfide material, selenide material and nitride material.

18. The apparatus of claim 5, wherein said dielectric stack comprises alternating layers of oxide materials that are designed to serve as a coating of any reflectance for a wavelength of interest.

19. The apparatus of claim 1, wherein said substrate comprises dielectric material.

20. The apparatus of claim 1, wherein said substrate comprises dielectric material selected from the group consisting of glass, silica and sapphire.

21. The apparatus of claim 1, wherein said substrate comprises organic material.

22. The apparatus of claim 1, wherein said substrate comprises polymeric material.

23. The apparatus of claim 1, wherein said substrate comprises material selected from the group consisting of plastics, nylon and resin.

24. The apparatus of claim 1, wherein said substrate comprises semiconductor material.

25. The apparatus of claim 1, wherein said substrate comprises semiconductor material selected from the group consisting of silicon and gallium arsenide.

26. The apparatus of claim 1, wherein said bulk layer comprises a relatively thick layer optically bonded to said outer layer of said plurality of layers.

27. The apparatus of claim 26, wherein said relatively thick layer has a thickness of at least >50 microns.

28. A method of fabricating an apparatus, the method comprising:
providing a substrate;
forming a plurality of layers on said substrate, wherein at least one layer of said layers comprises material with an electronic band gap that is at least 6.0 eV; and
not depositing, but optically bonding a bulk layer to an outer layer of said plurality of layers, wherein said bulk layer comprises fused silica or sapphire with an electronic band gap that is at least 5.0 eV,
wherein said outer layer of said plurality of layers comprises fused silica or sapphire.

29. The method of claim 28, wherein each layer of said plurality of layers comprises a dielectric material, wherein said each layer of said plurality of layers comprises either a high refractive index dielectric material or a low refractive index dielectric material, wherein said high refractive index dielectric material and said low refractive index dielectric material comprise a difference in refractive index greater than 0.1,
wherein said plurality of layers comprises a bottom layer, wherein said bottom layer is affixed to said substrate.

30. The method of claim 28, wherein said material of said at least one layer of said layers is selected from the group consisting of diamond, aluminum nitride, boron nitride, magnesium oxide, yttrium oxide and scandium oxide.

31. The method of claim 28, wherein said apparatus comprises a multi-layer dielectric (MLD) grating.

32. The method of claim 28, wherein said apparatus comprises a multilayer dielectric stack.

33. The method of claim 28, wherein said apparatus comprises a quarter-wave stack.

34. The method of claim 28, wherein said apparatus is selected from the group comprising a highly reflecting laser mirror, a partially transmissive output coupler, a dichroic mirror, an optical filter, a beam splitter, a heat reflector, a solar cell cover, a thin-film polarizer, a Bragg mirror and a Rugate filter.

35. The method of claim 28, wherein at least one layer of said layers comprises an anti-reflection coating.

36. The method of claim 32, wherein said dielectric stack comprises dielectric material transparent to a wavelength of interest.

37. The method of claim 32, wherein said dielectric stack comprises alternating layers of oxide material.

38. The method of claim 28, wherein said substrate comprises transparent material.

39. The method of claim 28, wherein said substrate comprises opaque material.

40. The method of claim 28, wherein said substrate comprises reflective material.

41. The method of claim 28, wherein said substrate is flat.

42. The method of claim 28, wherein said substrate comprises a curved surface.

43. The method of claim 42, wherein said curved surface has been prepared prior to affixing said plurality of layers to said substrate.

44. The method of claim 32, wherein said dielectric stack comprises alternating layers of material transparent to a wavelength of interest, wherein each layer of said plurality of layers comprises a material selected from the group consisting of oxide material, fluoride material, sulfide material, selenide material and nitride material.

45. The method of claim 32, wherein said dielectric stack comprises alternating layers of oxide material that are designed to serve as a coating of any reflectance for a wavelength of interest.

46. The method of claim 28, wherein said substrate comprises dielectric material.

47. The method of claim 28, wherein said substrate comprises dielectric material selected from the group consisting of glass, silica and sapphire.

48. The method of claim 28, wherein said substrate comprises organic material.

49. The method of claim 28, wherein said substrate comprises polymeric material.

50. The method of claim 28, wherein said substrate comprises material selected from the group consisting of plastics, nylon and resin.

51. The method of claim 28, wherein said substrate comprises semiconductor material.

52. The method of claim 28, wherein said substrate comprises semiconductor material selected from the group consisting of silicon and gallium arsenide.

53. The method of claim 28, wherein said bulk layer comprises a relatively thick layer.

54. The method of claim 53, wherein said relatively thick layer has a thickness of at least >50 microns.

* * * * *